US007878469B2

(12) United States Patent
Hasenoehrl et al.

(10) Patent No.: US 7,878,469 B2
(45) Date of Patent: Feb. 1, 2011

(54) QUICK RELEASE SCREED BAR HOLDER

(76) Inventors: Bryan Hasenoehrl, 1630 S. Viewpoint Dr., Lewiston, ID (US) 83501; Kevin Gordon, 1909 Sunflower Ln., Lewiston, ID (US) 83501

( * ) Notice: Subject to any disclaimer, the term of this patent is extended or adjusted under 35 U.S.C. 154(b) by 305 days.

(21) Appl. No.: 11/852,238

(22) Filed: Sep. 7, 2007

(65) Prior Publication Data

US 2009/0065660 A1 Mar. 12, 2009

(51) Int. Cl.

| | |
|---|---|
| ***A47B 96/06*** | (2006.01) |
| ***E04G 3/00*** | (2006.01) |
| ***E04G 5/06*** | (2006.01) |
| ***F16B 1/00*** | (2006.01) |
| ***G09F 7/18*** | (2006.01) |
| ***A47G 1/10*** | (2006.01) |
| ***E04C 3/16*** | (2006.01) |
| ***E04F 13/06*** | (2006.01) |
| ***E01C 19/22*** | (2006.01) |

(52) U.S. Cl. ........................... 248/229.11; 248/222.13; 248/229.21; 248/228.2; 248/230.2; 248/231.31; 248/316.2; 52/364; 52/365; 404/118; 404/119

(58) Field of Classification Search ............. 248/125.2, 248/229.11, 222.133, 229.21, 228.2, 230.2, 248/231.31, 243, 316.2, 229.1, 229.12, 229.22, 248/230.3, 231.41, 316.4; 52/364, 365, 367, 52/371, 678; 425/458, 62; 404/118, 119, 404/120

See application file for complete search history.

(56) References Cited

U.S. PATENT DOCUMENTS

| | | | | |
|---|---|---|---|---|
| 1,423,991 A | | 7/1922 | Brooks | |
| 1,589,356 A | | 6/1926 | Brooks | |
| 1,751,785 A | | 3/1930 | Awbrey | |
| 1,909,984 A | | 5/1933 | Prindle | |
| 2,227,713 A | | 1/1941 | Powell | |
| 3,016,225 A | * | 1/1962 | Hughes et al. | 248/229.11 |
| 3,533,583 A | * | 10/1970 | Azim | 248/125.2 |
| 3,539,142 A | * | 11/1970 | Morand | 248/230.2 |
| 4,371,330 A | | 2/1983 | Heffernan | |
| 4,674,722 A | * | 6/1987 | Danby et al. | 248/231.31 |
| 4,913,582 A | | 4/1990 | Barrett | |
| 4,934,643 A | | 6/1990 | Militano | |
| 5,191,821 A | * | 3/1993 | Metzger et al. | 83/425 |
| 5,257,764 A | | 11/1993 | Spaulding | |
| 5,468,095 A | | 11/1995 | Dawson | |
| 6,056,475 A | | 5/2000 | Peterick | |
| 6,709,194 B1 | | 3/2004 | Grimes | |
| 6,719,486 B2 | | 4/2004 | Craghan | |
| 7,192,216 B2 | | 3/2007 | Casale | |
| 7,566,150 B2 | * | 7/2009 | Adrien | 362/418 |

* cited by examiner

*Primary Examiner*—Terrell Mckinnon
*Assistant Examiner*—Christopher Garft

(57) ABSTRACT

A novel adjustable screed bar holder used to support screed bars used in concrete finish work. The holder moves along a supporting device such as a stake, pin, or post. A lever on the holder is coupled to a cam wheel such that movement of the lever will disengage the cam wheel from the stake. When the cam wheel is in the disengaged position the holder is free to move along the stake until the lever is released and the cam wheel secures against the stake. Typically the holder will be used to hold a piece of lumber, pipe, rebar, or tubing parallel to the forms used in concrete placement. A screed may then be run over the concrete while it rides on the screed bar supported by the adjustable holder.

2 Claims, 3 Drawing Sheets

QUICK RELEASE SCREED BAR HOLDER

BACKGROUND

The present invention relates to an improved screed bar holder used in concrete finish work. When concrete is poured into a form, it is necessary that the concrete be properly leveled prior to curing. This process of leveling and/or smoothing the uncured concrete is commonly known as "screeding."

Typically, a screed bar holder will clamp to a stake planted at the site of a concrete pour using a set screw. The screed bar holder is then moved up or down the stake until the desired height at the finish grade level is achieved. A screed bar that usually consists of a piece of lumber, pipe, rebar, or tubing is then placed in the screed bar holder. A leveling tool known as a screed, usually in the form of a piece of lumber is then drawn across the uncured concrete riding on the screed bar. This prevents the full weight of the finishing screed from resting on the concrete while the concrete is leveled.

There have been a wide variety of devices created for leveling uncured concrete. Similar devices known to address this issue include U.S. Pat. Nos. 4,934,643 and 6,709,194 B1. However, both of these patents use set screws to secure the screed bar holder apparatus on a supporting stake. Continually tightening and loosening the set screws in order to position and secure the screed bar holder at the proper height is tedious and time-consuming. Screeding by hand is a very labor intensive task, and any time saved is quite valuable.

Accordingly, there is a need for a novel screed bar holder which does not use conventional means of attachment and can be easily raised and lowered along a supporting stake to quickly secure the screed bar holder apparatus at the desired height.

The present invention serves to remedy the shortcomings of the prior art.

SUMMARY

The present invention is directed to a novel screed bar holder that satisfies the need in the art of concrete finish work for a holder that quickly secures to a stake without the use of traditional means of attachment, such as a set screw.

The screed bar holder includes a saddle with accompanying guard to support a screed bar. The inventive method of attachment to the stake includes a cam wheel coupled to a lever wherein the cam wheel is biased towards a position of engagement with the stake by way of a spring. Pushing or pulling the lever will release the cam wheel from a position of engagement with the stake. This in turn will allow the holder to move along the stake until the desired height is achieved and the lever released to secure the screed bar holder in place.

The screed bar holder can be constructed of any material of sufficient strength to withstand the rigors of concrete finish work. The holder is typically constructed of a material of high tensile strength such as steel or other metal alloy, although plastic could be used as well.

Another aspect of the present invention involves a method of using the screed bar holder. The steps of this novel method include first attaching the holder to a supporting member such as a stake, engaging the lever so as to disengage the cam wheel from the stake, moving the holder to the desired position on the stake, and releasing the lever in order to engage the cam wheel with the stake and secure the holder in position.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

These and other features, aspects and advantages of the present invention will become better understood with regard to the following description, claims, and accompanying drawings where:

DESCRIPTION

The present invention satisfies the need in the art for a screed bar holder which can quickly secure to a supporting member. This need is met in the present invention by incorporating a novel quick release securing mechanism to a traditional screed bar holder.

The following definitions apply to the improved screed bar holder:

A "saddle" refers to the supporting frame of the apparatus 1 with accompanying guard 7.

A "screed" refers to any tool used for striking off concrete such as a piece of lumber.

A "screed bar" refers to any tool of sufficient length and strength to properly support a screed such as a piece of lumber, rebar, pipe or tubing.

A "supporting member" refers to any device to which a screed bar holder attaches such as a stake, post, palisade, picket, pole, rod, or pin. A supporting member 8 is typically circular in shape, 18-24 inches in length, and ¾ of an inch to ⅞ of an inch in diameter. However, the length, width, and shape of a supporting member 8 is not unique and can vary from the typical embodiments listed above.

Figure 1:
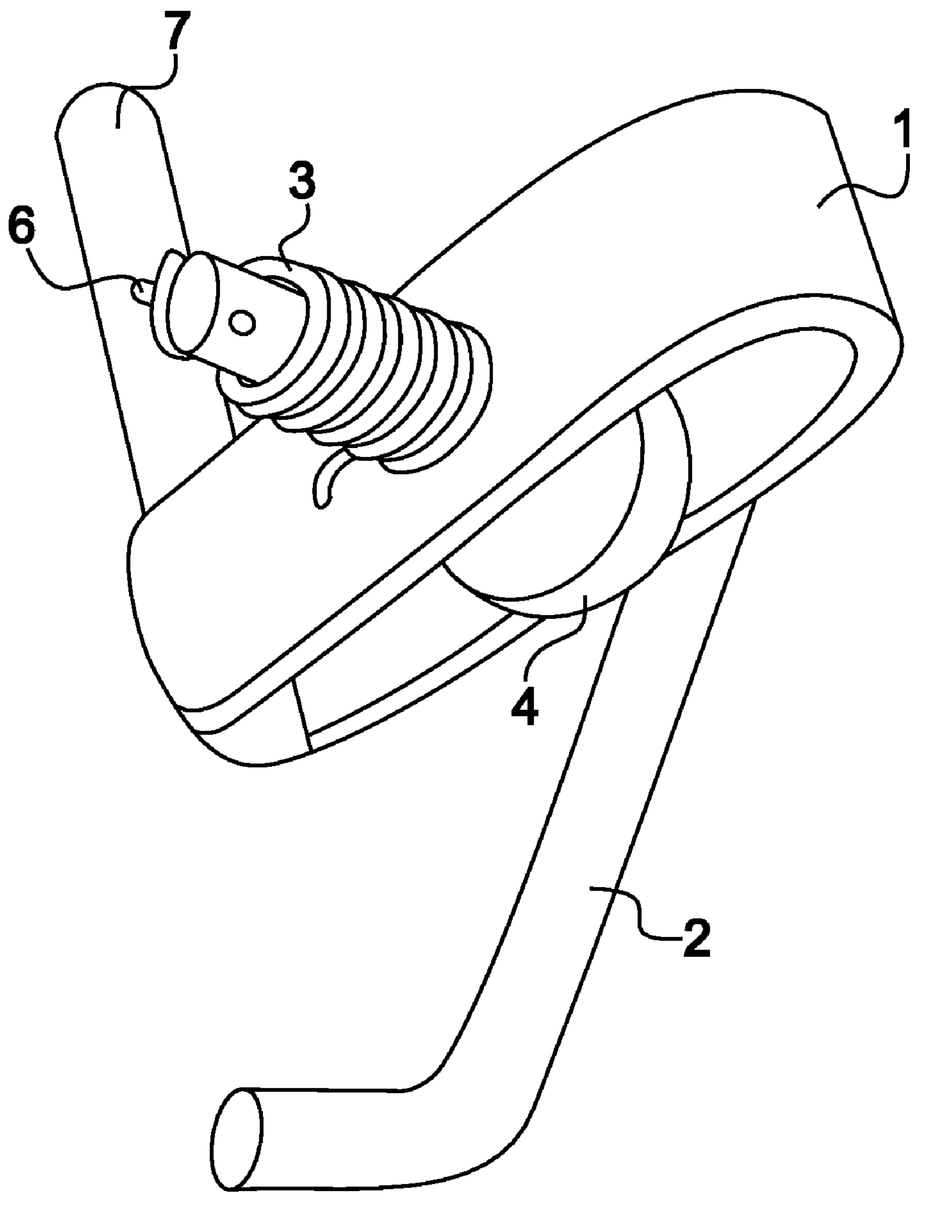
FIG. 1 shows a perspective view of the apparatus.
Figure 2:
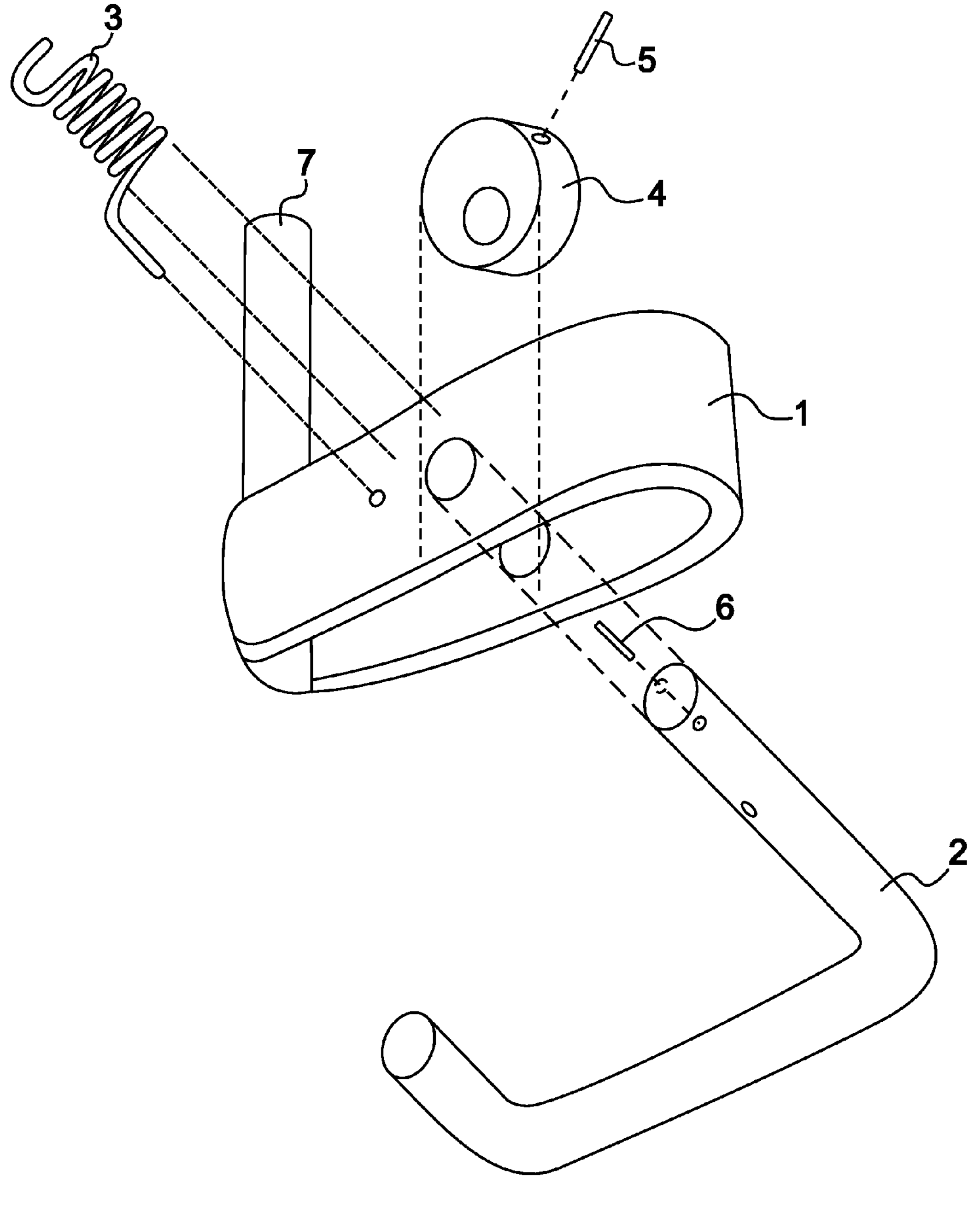
FIG. 2 shows an exploded perspective view of the apparatus.
Figure 3:
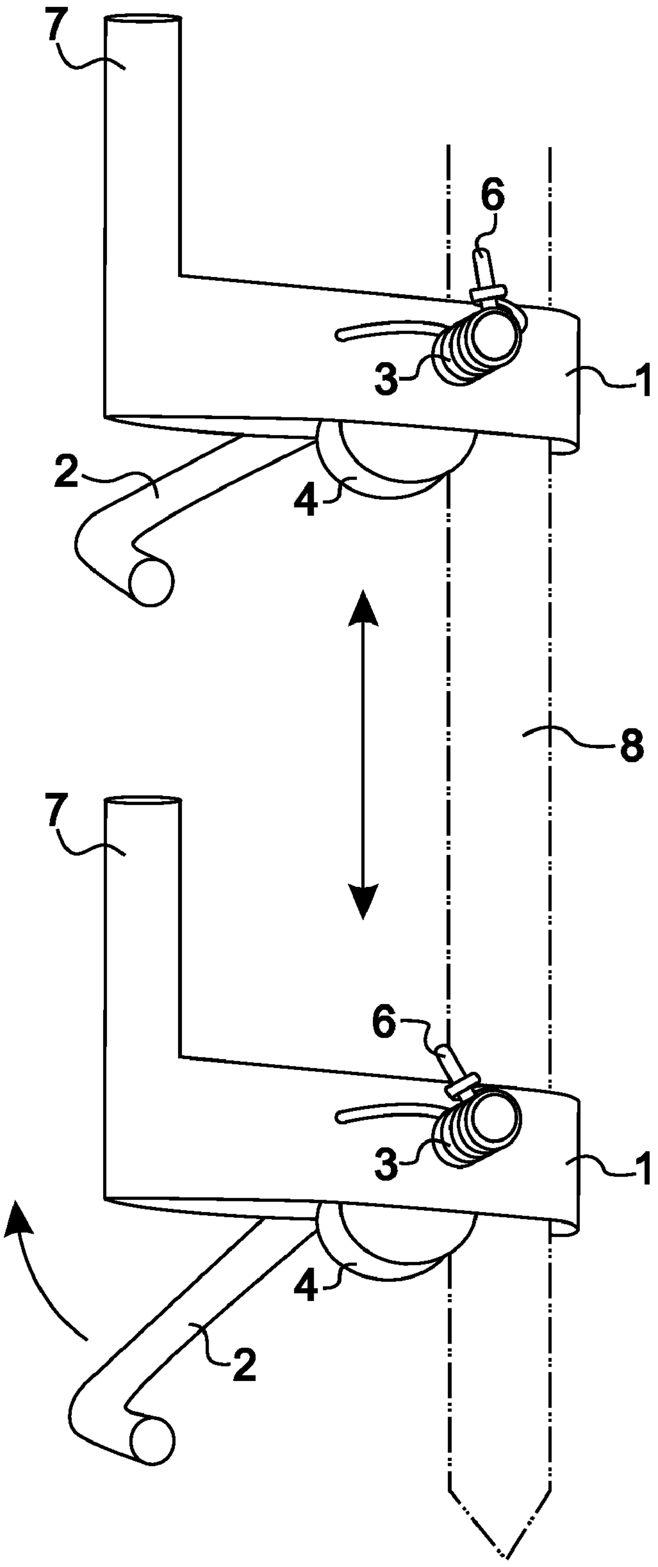
FIG. 3 shows a side view of apparatus coupled to a supporting stake.

In a preferred embodiment, shown in FIGS. 1, 2, and 3 there is shown a saddle 1 with accompanying guard 7. The saddle 1 and guard 7 are preferably comprised of a high strength material such as steel. However, they could be composed of any metal alloy or plastic. The guard 7 is welded or secured to the saddle 1 and located approximately 2" from supporting member 8. The guard 7 is approximately 3" in height. The saddle 1 wraps around the supporting member 8 forming a U-shape when viewed from above with respect to FIGS. 1 and 2. As shown in FIG. 3, the "upper" and "lower" sides of saddle 1 are substantially flat. As shown in FIGS. 1 and 2, the walls of the saddle 1 are approximately 1" in height and ¼" wide.

A C-shaped lever 2 extends through circular holes which are located in either side of the saddle 1 near the midpoint of the saddle 1. A pin 6 is fitted tightly within a hole located at one end of the lever 2. A spring 3 with two ends is then secured to the pin 6 at first end and to the saddle 1 at second end by way of a hole which has been drilled through the saddle 2 and into which the second end of spring 3 tightly fits.

A cam wheel 4 is positioned vertically in the interior of the U-shaped saddle 1. The lever 2 extends through the wheel by way of a hole located off-center axis. A pin 5 is securely fitted between a hole located in the cam wheel 4 and a hole located in the lever 2. The pin 5 ensures that the lever 2 and cam wheel 4 move as if they were a single piece. The cam wheel 4 is biased towards engagement in a secured position with the supporting member 8 by the spring 3 that is secured to the saddle 1 and pin 6 located at the end of the lever 2. When the lever 2 is pulled or pushed up as shown in FIG. 3., the cam wheel 4 is disengaged from contact with the supporting member 8 and the saddle 1 is free to move along the supporting member 8.

In operation, multiple supporting members 8 would be placed on either side of a concrete pour. The novel screed bar holders would then be mounted on each of the supporting members 8 and adjusted to the finish grade level by pulling the lever 2 and releasing the cam wheel 4 from engagement with the supporting member 8. This would allow the saddle 1 to be raised or lowered on the supporting member 8. When the desired height is achieved, the lever 2 is released causing the cam wheel 4 to engage the supporting member 8 and fix the saddle 1 in a secured position on the supporting member 8. A screed bar would then be placed in the screed bar holders positioned on either side of the pour. A screed could then be drawn across the pour to smooth the concrete at the finish grade level while riding on the screed bar supported by the novel screed bar holders.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the screed bar holder. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Also, any element in a claim that does not specifically state "means for" performing a function, should not be interpreted as a "means" or "step" clause as specified in 35 U.S.C. §112.

What is claimed is:

1. A screed bar holder apparatus comprising: a saddle; a cam wheel having a circumferential surface located between walls of said saddle, pivotably movable into and out of engagement with a supporting member; a lever coupled to said cam wheel and said saddle such that when the lever is pressed the cam wheel pivots away and disengages from a secured position on said supporting member allowing said saddle to move along said supporting member; and a spring coupled to said lever and said saddle biasing said cam wheel into engagement with said supporting member; wherein said saddle having first and second holes directly opposite through which said lever passes and a third hole in which said spring is secured; wherein said lever having a first hole is coupled to said cam wheel having a first hole by extending through said first hole in cam wheel and secured by means of a first pin securely fitted between said first hole in lever and said cam wheel having a second hole located on the circumference of said cam wheel.

2. An apparatus as set forth in claim 1 wherein said lever having a second hole located near one end of said lever is coupled to said spring by a second pin that is securely fitted in said second hole to which one end of the spring connects and to which the other end of the spring is securely fitted to said saddle in said third hole.

* * * * *